United States Patent
Hsu

(10) Patent No.: US 10,551,211 B2
(45) Date of Patent: Feb. 4, 2020

(54) METHODS AND DEVICES WITH SENSOR TIME CALIBRATION

(71) Applicant: CM HK Limited, Fortress Hill (HK)

(72) Inventor: Chien-Chih Hsu, Taipei (TW)

(73) Assignee: CM HK LIMITED, Fortress Hill (HK)

(*) Notice: Subject to any disclaimer, the term of this patent is extended or adjusted under 35 U.S.C. 154(b) by 197 days.

(21) Appl. No.: 15/430,619

(22) Filed: Feb. 13, 2017

(65) Prior Publication Data

US 2017/0153121 A1     Jun. 1, 2017

Related U.S. Application Data

(63) Continuation-in-part of application No. 15/357,176, filed on Nov. 21, 2016, now Pat. No. 9,885,734.

(Continued)

(30) Foreign Application Priority Data

May 8, 2013    (CN) ..................... 2013 2 0245496 U

(51) Int. Cl.
    *G01C 25/00*     (2006.01)
    *G01D 3/10*     (2006.01)
    *G01C 22/00*     (2006.01)

(52) U.S. Cl.
    CPC ........... *G01C 25/00* (2013.01); *G01C 22/006* (2013.01)

(58) Field of Classification Search
    CPC ...... G01C 25/00; G01C 21/14; G01C 22/006; G01C 22/00; G01D 3/10; G01D 11/00
    See application file for complete search history.

(56) References Cited

U.S. PATENT DOCUMENTS

| | | |
|---|---|---|
| 4,965,550 A | 10/1990 | Wroblewski |
| 5,355,503 A | 10/1994 | Soffel et al. |

(Continued)

FOREIGN PATENT DOCUMENTS

| | | |
|---|---|---|
| CN | 101911048 A | 12/2010 |
| CN | 102818913 A | 12/2012 |

(Continued)

OTHER PUBLICATIONS

Marquez et al., Motion-Logger: An Attitude and Motion Sensing System, Dec. 12-15, 2011, 2011 50th IEEE Conference on Decision and Control and European Control Conference (CDC-ECC), Orlando, FL, pp. 5311-5316 (Year: 2011).*

(Continued)

*Primary Examiner* — Toan M Le
(74) *Attorney, Agent, or Firm* — McClure, Qualey & Rodack, LLP

(57) ABSTRACT

Methods and devices with sensor time calibration are provided. A representative device incorporates: a motion sensor having sensor circuitry and a first clock, the motion sensor being configured to generate and store sensor data samples at a predefined output data rate according the first clock; and a microcontroller, having circuitry, coupled to the motion sensor and being configured to fetch, during a predefined average time span, a sequence of the sensor data samples from the motion sensor and calculate a total number of the sensor data samples fetched. The microcontroller is further configured to provide a calibrated output data rate based on the total number of sensor data samples fetched and a reference time span, corresponding to a time span during which the sensor data samples were stored at the predefined output data rate, provided by a second clock.

18 Claims, 11 Drawing Sheets

Related U.S. Application Data which is a continuation-in-part of application No. 14/088,452, filed on Nov. 25, 2013, now Pat. No. 9,534,927, which is a continuation-in-part of application No. 13/945,930, filed on Jul. 19, 2013, now Pat. No. 9,798,390, and a continuation-in-part of application No. 14/033,553, filed on Sep. 23, 2013, now Pat. No. 9,104,417.

(60) Provisional application No. 62/302,192, filed on Mar. 2, 2016.

(56) References Cited

U.S. PATENT DOCUMENTS

| | | | |
|---|---|---|---|
| 6,256,746 | B1 | 7/2001 | Cheng |
| 6,557,107 | B1 | 4/2003 | Kim |
| 7,000,469 | B2 | 2/2006 | Foxlin et al. |
| 9,104,417 | B2 | 8/2015 | Ye et al. |
| 9,534,927 | B2 * | 1/2017 | Ye .................. G01C 22/006 |
| 9,798,390 | B2 * | 10/2017 | Ye .................. G06F 3/017 |
| 9,885,734 | B2 * | 2/2018 | Liou .................. G01D 3/10 |
| 2007/0113286 | A1 | 5/2007 | Cromer et al. |
| 2008/0238772 | A1 | 10/2008 | Soloviev et al. |
| 2009/0184849 | A1 | 7/2009 | Nasiri et al. |
| 2009/0265671 | A1 | 10/2009 | Sachs et al. |
| 2010/0317295 | A1 | 12/2010 | Borsella et al. |
| 2011/0109330 | A1 | 5/2011 | Ikuta et al. |
| 2011/0163955 | A1 | 7/2011 | Nasiri et al. |
| 2012/0022844 | A1 | 1/2012 | Teixeira |
| 2012/0277545 | A1 | 11/2012 | Texeira |
| 2014/0136871 | A1 | 5/2014 | Jung et al. |
| 2014/0266360 | A1 | 9/2014 | Ma et al. |
| 2015/0035754 | A1 | 2/2015 | Lim |

FOREIGN PATENT DOCUMENTS

| | | |
|---|---|---|
| CN | 103543826 A | 1/2014 |
| TW | 550567 B | 9/2003 |
| TW | 201504936 A | 2/2015 |
| WO | 2009091873 A1 | 7/2009 |

OTHER PUBLICATIONS

TW Office Action dated Feb. 12, 2018 in Taiwan application (No. 106106715).

Search Report issued in TW Office Action dated Feb. 12, 2018 in Taiwan application (No. 106106715).

Soloviev et al., Utilizing Multipath Reflections in Deeply Integrated GPS/INS Architecture for Navigation in Urban Environments, 2008 IEEE, pp. 383-393.

Jia, Ning. "Fall Detection Application by Using 3-Axis Accelerometer ADXL345". Analog Devices. AN-1 023 Application Note. Copyright 2009. Availabile: http:/ /blog.ednch ina.geo.eet-en.com/ uploadedn/Biog/2009/7/1/32909b38-5e12-4a32-bd7 e-19e75256ed35. pdf.

SIPO Office Action dated May 13, 2019, Application No. 201710122185.7, pp. 1-11.

* cited by examiner

METHODS AND DEVICES WITH SENSOR TIME CALIBRATION

CROSS-REFERENCE TO RELATED APPLICATIONS

This utility application is based on and claims priority to U.S. provisional application 62/302,192, filed on Mar. 2, 2016, and is a continuation-in-part application, which is based on and claims priority to U.S. application Ser. No. 15/357,176, filed on Nov. 21, 2016 (now patented as U.S. Pat. No. 9,885,734, issued on Feb. 6, 2018). U.S. application Ser. No. 15/357,176 is a continuation-in-part application of and claims the priority benefit of a prior U.S. application Ser. No. 14/088,452, filed on Nov. 25, 2013 (now patented as U.S. Pat. No. 9,534,927, issued on Jan. 3, 2017), which is a continuation-in-part application of and claims the priority benefit of a prior U.S. application Ser. No. 13/945,930, filed on Jul. 19, 2013 (now patented as U.S. Pat. No. 9,798,390, issued on Oct. 24, 2017), and which is also a continuation-in-part application of and claims the priority benefit of a prior U.S. application Ser. No. 14/033,553, filed on Sep. 23, 2013 know patented as U.S. Pat. No. 9,104,417, issued on Aug. 11, 2015). The prior U.S. application Ser. No. 14/033,553 claims the priority benefit of China application serial no. 201320245496.X, filed on May 8, 2013. The entirety of each of the above-mentioned patent applications is hereby incorporated by reference herein and made a part of this specification.

BACKGROUND OF THE INVENTION

1. Field of the Invention

The present application relates to a mobile device.

2. Description of the Related Art

Nowadays a mobile device is often equipped with embedded sensors, such as accelerometer, gyro-sensor and magnetometer. The central processing unit (CPU) of the mobile device can collect samples generated by the sensors and perform some processing based on the samples. For example, the CPU can calculate the movement and the orientation of the mobile device or calculate how many steps the user of the mobile device has walked.

Since the sensors keep generating samples, the CPU has to receive and analyze the samples constantly. Therefore, the CPU has to be in its full operation mode for extended periods of time, which consumes electric power and shortens the battery life of the mobile device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
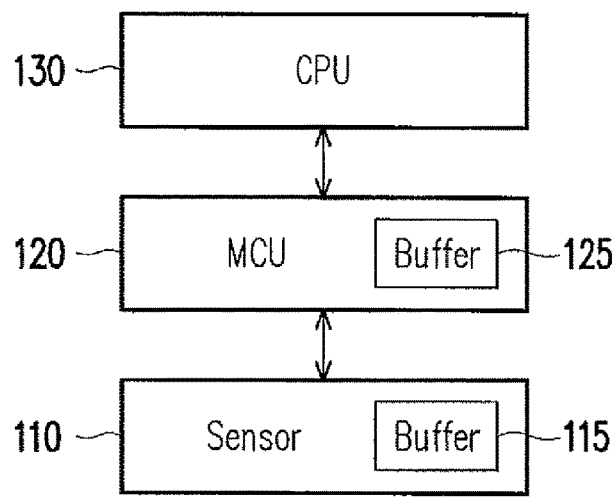
FIG. 1 is a schematic diagram showing a mobile device according to an embodiment of the present application.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a mobile device 100 according to an embodiment of the present application. The mobile device 100 may be a remote controller, a smart phone, a personal digital assistant (PDA), a tablet computer, or a notebook computer, etc. The mobile device 100 includes a sensor 110, an MCU 120, and a CPU 130. The MCU 120 is coupled to the sensor 110. The CPU 130 is coupled to the MCU 120. The sensor 110 includes a buffer 115. The MCU 120 includes a buffer 125. The buffers 115 and 125 are storage devices, such as register or memory.

The sensor 110 generates a plurality of samples. The sensor 110 may store the samples in the buffer 115. The MCU 120 fetches the samples from the sensor 110 and performs an initial preset processing according to the samples to generate one or more results of the initial preset processing. The MCU 120 may store either the samples or the result(s) in the buffer 125. Alternatively, the MCU 120 may store both the samples and the result(s) in the buffer 125.

The CPU 130 fetches the one or more results from the MCU 120 or receives a signal based on the one or more results from the MCU 120. The CPU 130 performs further preset processing according to the one or more results or the signal from the MCU 120.

In an embodiment of the present application, the sensor 110 generates the samples at a frequency $F_1$, which means the sensor 110 generates $F_1$ samples every second. The MCU 120 fetches the samples from the sensor 110 in batches at a frequency $F_2$. The CPU 130 fetches the results from the MCU 120 in batches at a frequency $F_3$. The frequency $F_1$ may be higher than or equal to the frequency $F_2$. The frequency $F_2$ may be higher than or equal to the frequency $F_3$.

For example, $F_1$ may be 2000 Hz, $F_2$ may be 1 Hz, and $F_3$ may be 0.001 Hz. The sensor 110 generates 2000 samples every second. The MCU 120 fetches the samples from the sensor 110 once in every second. In each fetching, the MCU 120 fetches the 2000 samples as a single batch from the sensor 110. After each fetching, the MCU 120 performs the initial preset processing and generates 40 results based on the 2000 samples. The CPU 130 fetches the 40 results as a single batch from the MCU 120 once every 1000 seconds. After each fetching, the CPU 130 performs further preset processing according to the 40 results. This batch fetching mechanism alleviates the burden of obtaining samples of the MCU 120 because the MCU 120 does not have to fetch the samples one by one from the sensor 110. Similarly, this batch fetching mechanism alleviates the burden of obtaining results of the CPU 130 because the CPU 130 does not have to fetch the results one by one from the MCU 120.

The CPU 130 executes the operating system (OS) and the applications of the mobile device 100. The further preset processing is just one of many tasks performed by the CPU 130. The MCU 120 is exclusively dedicated to performing the initial preset processing according to the samples and providing the one or more results or the signal to the CPU 130. The CPU 130 has much more processing power than the MCU 120 does and the CPU 130 consumes much more electric power than the MCU 120 does. The MCU 120 takes over the burden of collecting the samples from the sensor 110 and performing the initial preset processing from the CPU 130 so that the CPU 130 can sleep as long as possible in order to save power and extend the battery life of the mobile device 100. The batch fetching of results from the MCU 120 helps to reduce the waking frequency of the CPU 130, which saves more power. The MCU 120 constantly polls the sensor 110 and fetches the samples from the sensor 110. The MCU 120 never sleeps.

The CPU 130 may sleep until the CPU 130 wakes up to fetch the result from the MCU 120 or until the CPU 130 is woke up by the signal from the MCU 120. The MCU 120 may wake up the CPU 130 and notifies the CPU 130 to fetch the result from the MCU 120. Alternatively, the CPU 130 may wake up when the user of the mobile device 100 launches an application or when a timer expires. In other words, the CPU 130 may wake up without notification from the MCU 120, and then the CPU 130 may fetch the one or more results from the MCU 120.

Figure 2:
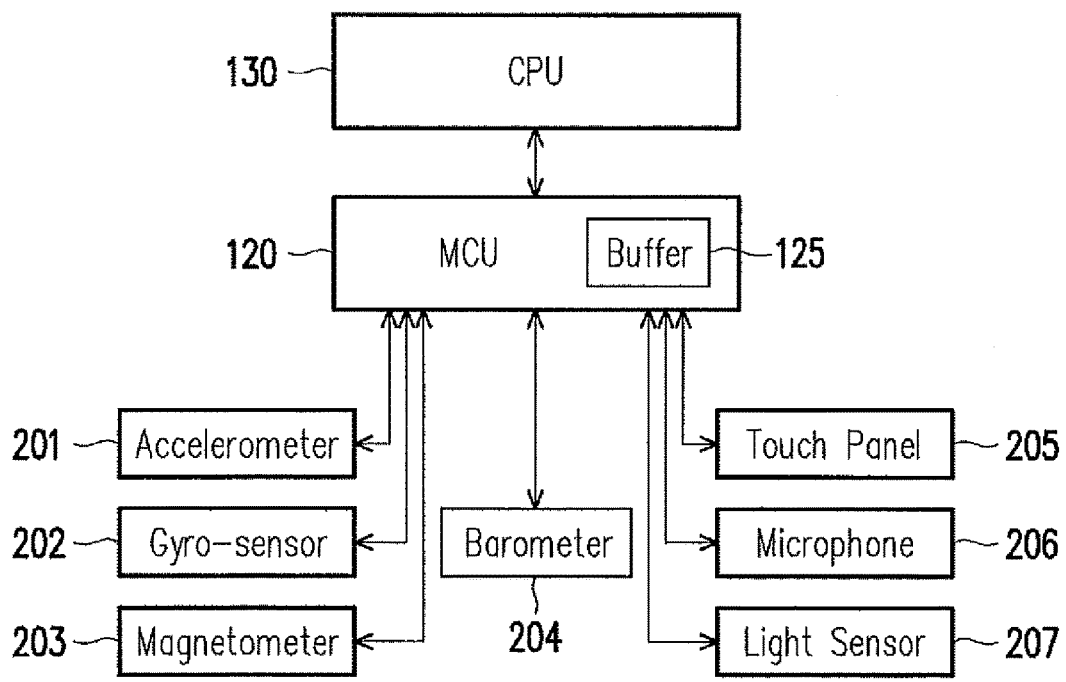
FIG. 2 is a schematic diagram showing a mobile device according to another embodiment of the present application.

FIG. 2 is a schematic diagram showing a mobile device 200 according to another embodiment of the present application. The mobile device 200 includes the CPU 130, the MCU 120, and seven sensors 201-207, namely, the accelerometer 201, the gyro-sensor 202, the magnetometer 203, the barometer 204, the touch panel 205, the microphone 206, and the light sensor 207. The accelerometer 201 generates samples of accelerations associated with movements and rotations of the mobile device 200. The gyro-sensor 202 generates samples of angular velocities associated with movements and rotations of the mobile device 200. The magnetometer 203 generates samples of magnetism associated with movements and rotations of the mobile device 200. The barometer 204 generates samples of atmospheric pressures associated with movements and rotations of the mobile device 200. The touch panel 205 generates samples of locations touched by the user of the mobile device 200. The microphone 206 generates samples of sound around the mobile device 200. The light sensor 207 generates samples of the ambient brightness around the mobile device 200. Each of the sensors 201-207 may include a buffer as the sensor 110 does.

The MCU 120 is coupled to all of the sensors 201-207 and operates as a sensor hub. Each subset of the mobile device 200 including the CPU 130, the MCU 120, and one of the sensors 201-207 may operate in the same ways as the mobile device 100 shown in FIG. 1 does. In addition, the MCU 120 and the CPU 130 may perform preset processing based on samples generated by multiple sensors altogether. In another embodiment of the present application, the mobile device 200 may include less than seven sensors or more than seven sensors.

In an embodiment of the present application, the mobile device 200 may provide the function of a pedometer. The MCU 120 fetches the samples from the accelerometer 201 and performs the initial preset processing by calculating how many steps the user of the mobile device 200 has walked according to the samples. The MCU 120 may store the result of the initial preset processing, namely, the number of steps, in the buffer 125.

The MCU 120 may wake up the CPU 130 to fetch the result every N steps, wherein N is a preset positive integer. Alternatively, the CPU may wake up periodically to fetch the result from the MCU 120. Alternatively, the CPU may wake up whenever the user launches an application to see the number of steps. The infrequent awakening of the CPU 130 saves energy. Sometimes the user walks for hours and does not want to see the number of steps until the user arrives at home. In this case, the CPU 130 may sleep for hours and saves a lot of energy.

In addition to counting the number of steps, the initial preset processing performed by the MCU 120 may include calculating the direction and the distance of each step of the user according to the samples generated by the accelerometer 201, the gyro-sensor 202, and the magnetometer 203. The MCU 120 may store the results, namely, the directions and distances of the steps, in the buffer 125. The MCU 120 may wake up the CPU 130 and notifies the CPU 130 to fetch the results when the size of the results reaches a preset percentage of the capacity of the buffer 125.

When the CPU 130 wakes up, the further preset processing performed by the CPU 130 may include displaying the number of steps, displaying a chart showing the number of steps in each hour, or plotting the trace of the user according to the directions and the distances of the steps, etc.

In another embodiment of the present application, the mobile device 200 may provide functions of positioning and navigation based on the Global Positioning System (GPS). The user may turn off the GPS function to save power. The CPU 130 sleeps when the GPS function is turned off. During the period when the GPS function is turned off, the MCU 120 may fetch the samples generated by the accelerometer 201, the gyro-sensor 202, and the magnetometer 203 to calculate the moving trace of the mobile device 200. The MCU 120 may store the moving trace in the buffer 125 as the result of the initial preset processing. When the user turns on the GPS function, the CPU 130 may fetch the moving trace from the MCU 120 and use the moving trace and the last GPS position of the mobile device 200 to calculate a reference position so that the CPU 130 can find the current GPS position of the mobile device 200 faster.

In another embodiment of the present application, the MCU 120 may calculate the moving trace of the mobile device 200 according to the samples generated by the barometer 204 in addition to the samples generated by the accelerometer 201, the gyro-sensor 202, and the magnetometer 203, so that the moving trace can include more accurate estimation of the change of altitude of the mobile device 200.

In another embodiment of the present application, the mobile device 200 may switch between an unlocked state and a locked state. The mobile device 200 receives input from the touch panel 205 normally in the unlocked state, while the mobile device 200 does not receive input from the touch panel 205 in the locked state. The CPU 130 sleeps in the locked state. For example, the mobile device 200 may enter the locked state from the unlocked state when the mobile device 200 has been idle for a preset period of time, and the mobile device 200 may return to the unlocked state when the user performs a preset operation on the mobile device 200.

The preset operation for unlocking the mobile device 200 may be drawing a preset trace on the touch panel 205. In this case, the MCU 200 may fetch the samples generated by the touch panel 205 and analyze the samples to determine whether the user draws the preset trace or not. When the user finishes the preset trace on the touch panel 205, the MCU 120 may send a signal, such as an interrupt, to wake up the CPU 130. The CPU 130 switches the mobile device 200 from the locked state to the unlocked state in response to the signal.

Alternatively, the preset operation for unlocking the mobile device 200 may be speaking a preset password to the microphone 206. In this case, the MCU 200 may fetch the samples generated by the microphone 206 and perform speech recognition on the samples to determine whether the user speaks the preset password or not. When the user speaks the preset password to the microphone 206, the MCU 120 may send a signal to wake up the CPU 130. The CPU 130 switches the mobile device 200 from the locked state to the unlocked state in response to the signal.

Alternatively, the preset operation for unlocking the mobile device 200 may be holding the mobile device 200 and moving the mobile device 200 along a preset trace. In this case, the MCU 200 may fetch the samples generated by the accelerometer 201, the gyro-sensor 202, and the magnetometer 203 and analyze the samples to determine whether the mobile device 200 has moved along the preset trace or not. When the mobile device 200 has moved along the preset trace, the MCU 120 may send a signal to wake up the CPU 130. The CPU 130 switches the mobile device 200 from the locked state to the unlocked state in response to the signal.

In another embodiment of the present application, the mobile device 200 may include a display. The MCU 120 may fetch the samples generated by the light sensor 207 and analyze the samples to calculate the average ambient brightness of the mobile device 200 over a recent period of time with a predetermined length. The MCU 120 may store the average ambient brightness in the buffer 125. The CPU 130 may fetch the average ambient brightness periodically and adjusts the display brightness of the display according to the average ambient brightness.

Figure 3:
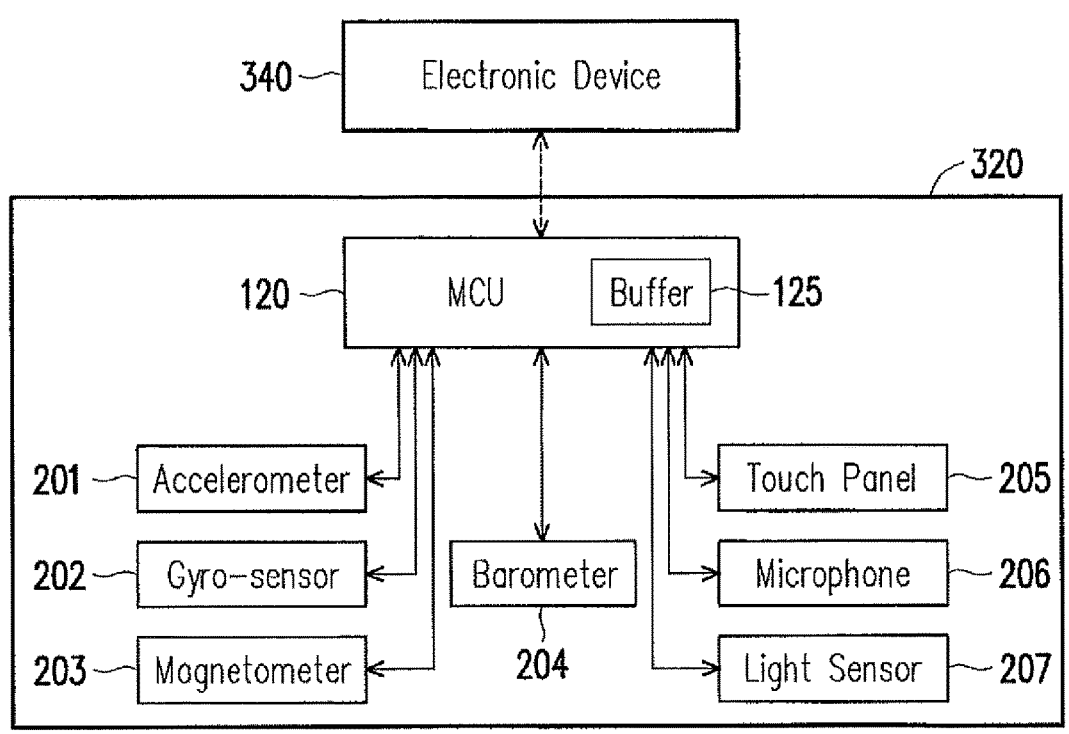
FIG. 3 is a schematic diagram showing a mobile device according to another embodiment of the present application.

FIG. 3 is a schematic diagram showing a mobile device 320 according to another embodiment of the present application. The mobile device 320 includes the MCU 120 and the sensors 201-207. Similar to the previous embodiments, the MCU 120 may fetch the samples generated by one or more of the sensors 201-207 and performs the initial preset processing according to the samples. The MCU 120 may store the samples and/or the result(s) of the initial preset processing in the buffer 125. The MCU 120 in this embodiment is configured to connect to the electronic device 340 through a wireless connection or a wired connection. The MCU 120 is further configured to provide the result(s) of the initial preset processing to the electronic device 340 through the wireless connection or the wired connection. The electronic device 340 may perform further preset processing according to the one or more results. In some aspects, the electronic device 340 is analogous to the CPU 130 in the previous embodiments.

For example, the mobile device 320 may be a wearable electronic pedometer. The MCU 120 counts the number of steps walked by the user according to the samples generated by the accelerometer 201. The MCU 120 may store the number of steps in the buffer 125. In addition, the MCU 120 may provide the number of steps to the electronic device 340 for further viewing or processing.

For another example, the mobile device 320 may be a small device attachable to a palm or an arm of a user or a golf stick wielded by the user. When the user plays golf, the MCU 120 may fetch the samples generated by the accelerometer 201, the gyro-sensor 202, and the magnetometer 203 to calculate the number of swings of the golf stick made by the user. The MCU 120 may store the number of swings in the buffer 125. In addition, the MCU 120 may provide the number of swings to the electronic device 340 for further viewing or processing.

Alternatively, the MCU may analyze the samples generated by the accelerometer 201, the gyro-sensor 202, and the magnetometer 203 to obtain the time and force of each swing of the golf stick made by the user. The MCU 120 may store the results of the analysis in the buffer 125. In addition, the MCU 120 may provide the results of the analysis to the electronic device 340 for further viewing or processing.

In summary, the MCU provided by the present application is a sensor hub with a buffer. The MCU can take over the burden of collecting and analyzing the samples generated by the sensors from the CPU of a mobile device. As a result, the MCU alleviates the burden of the CPU and the CPU may sleep as long as possible to save energy and extend the battery life of the mobile device.

Figure 4:
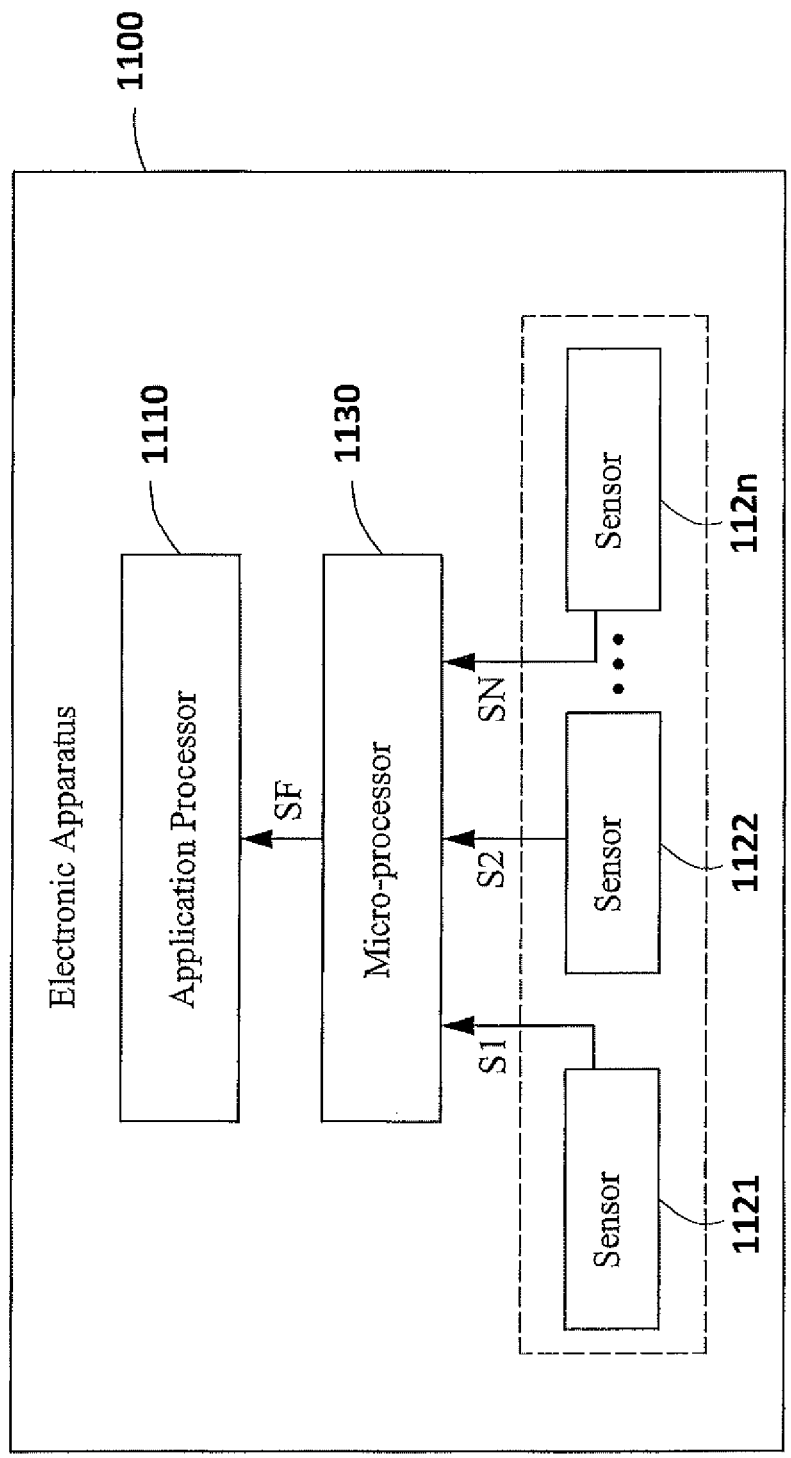
FIG. 4 is a diagram showing an electronic apparatus according to another embodiment of the present application.

Please refer to FIG. 4. FIG. 4 is a diagram showing an electronic apparatus 1100 according to another embodiment of the present application. The electronic apparatus 1100 can be a mobile phone, a tablet PC, a PDA, etc. The electronic apparatus 1100 may include, but is not limited to, an application processor 1110 (e.g., a CPU), a plurality of sensors 1121-112*n*, and a micro-processor 1130 (e.g., an MCU). The plurality of sensors 1121-112*n* is configured to generate at least one sensing signal(s) S1-Sn. The application processor 1110 is configured to execute an application procedure according to a sensing-merged signal SF. The micro-processor 1130 is coupled between the plurality of sensors 1121-112*n* and the application processor 1110, and is configured to generate the sensing-merged signal SF according to the at least one sensing signal(s) S1-Sn.

The plurality of sensors 1121-112*n* mentioned above can be implemented by an accelerometer, a rotation sensor, a magnetometer, and/or an altimeter, however, this should not be a limitation of the present application. In addition, please note that, a computing ability of the application processor 1110 is greater than a computing ability of the micro-processor 1130. For example, the application processor 1110 may be a multi-core baseband processor of a mobile phone, and the micro-processor 1130 may be a single chip micro-controller. Those skilled in the art should understand the difference(s) between the application processor 1110 and the micro-processor 1130 easily, and thus further description is omitted here for brevity.

Please be noted that, when the application processor 1110 of the electronic apparatus 100 of the present application gets into a sleep mode, the micro-processor 1130 is still working so as to maintain fundamental functions of the electronic apparatus 1100. As a result, even if the handheld electronic apparatus 1100 gets into the sleep mode, the application processor 1110 can be waked up through detecting motions of the electronic apparatus 1100. For example, when the application processor 1110 gets into the sleep mode, the application processor 1110 turns off a display module (not shown) of the electronic apparatus 1100, and locks a touch panel (not shown) of the electronic apparatus 1100. The locking mechanism of the electronic apparatus 1100 of the present application is listed below. Step (1): a user swings the electronic apparatus 1100, and motions and/or rotations of the electronic apparatus 100 are detected by the plurality of sensors 1121-112$n$ so as to generate sensing signals S1-Sn; step (2) the sensing-merged signal SF, which can be used for waking up the application processor 1110, is then generated by the micro-processor 1130 according to the sensing signals S1-Sn; and step (3) the application processor 1110 receives the sensing-merged signal SF and then executes an application procedure according to the sensing-merged signal SF. For example, the application processor 1110 may compare the sensing-merged signal SF to see whether it corresponds to a specific gesture or not; and if the sensing-merged signal SF corresponds to the specific gesture, the abovementioned display module will be enabled and enter an unlocked status automatically. Therefore, the electronic apparatus 1100 no need to have a physical button as the prior art, and the user no need to press the physical button so as to unlock the electronic apparatus 1100. In addition, when the display module of the electronic apparatus 1100 is turned off, the application processor 1110 can continue to play back music. The electronic apparatus 1100 of the present application can generate motion data through detecting motions and/or rotations according to the plurality of sensors 1121-112$n$ when the user swings the electronic apparatus 1100; and the micro-processor 1130 can process the motion data and then the application processor 1110 can control the played music. For example, the user can beat the left side of the electronic apparatus 1100 so as to select to play back a previous song, or beat the right side of the electronic apparatus 1100 so as to select to play back a next song.

On the other hand, another advantage of the present application is that: the function of the step counter, or pedometer, can still work after the application processor 1110 gets into the sleep mode. For example, when the application processor 1110 gets into the sleep mode and the electronic apparatus 1100 uses the function of the step counter, the sensor 1121 (such as an accelerometer) can generate the at least one sensing signal S1. The micro-processor 1130 can generate a counting information according to the at least one sensing signal S1 generated by the accelerometer. Please note that, in another embodiment of the present application, the micro-processor 1130 can set a default counting information, such as 1000 counts. That is to say, when the counting information is up to 1000 counts, the micro-processor 1130 can wake up the application processor 1110 by using the sensing-merged signal SF.

Figure 5:
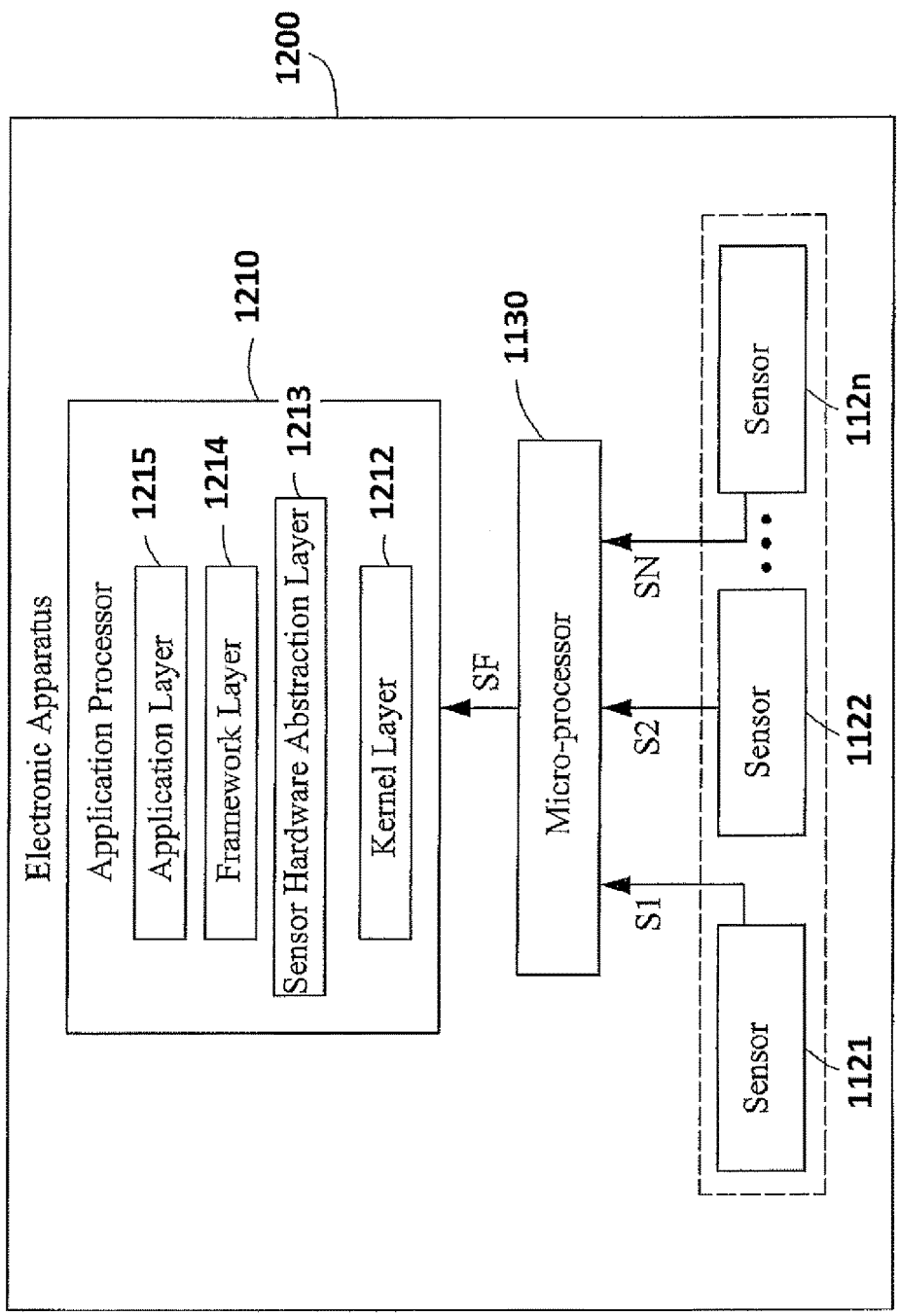
FIG. 5 is a diagram showing an electronic apparatus according to another embodiment of the present application.

Please refer to FIG. 5. FIG. 5 is a diagram showing an electronic apparatus 1200 according to a second embodiment of the present application. The electronic apparatus 1200 may include an application processor 1210 (e.g., a CPU), a micro-processor 1130 (e.g., an MCU), and a plurality of sensors 1121-112$n$. The plurality of sensors 1121-112$n$ mentioned above can be implemented by an accelerometer, a rotation sensor, a magnetometer, and/or an altimeter. The application processor 1210 may include a Kernel layer 1212, a sensor hardware abstraction layer (sensor HAL) 1213, a framework layer 1214, and an application layer 1215, wherein the application layer 1215 can be Android System's application layer. The micro-processor 1130 is disposed between the application processor 1210 and the plurality of sensors 1121-112$n$. The plurality of sensors 1121-112$n$ will generate corresponding sensing signals S1-SN after sensing, and will transmit the sensing signals S1-SN to the micro-processor 1130. The micro-processor 1130 merges the sensing signals S1-SN generated by the plurality of sensors 1121-112$n$ and then transmits a sensing-merged signal SF to the application processor 1210. The application processor 1210 executes a corresponding application procedure according to the sensing-merged signal SF. Please be noted that, the communication between the application processor 1210 and the micro-processor 1130 is implemented by an internal integrated circuited port; and the communication between the micro-processor 1130 and the plurality of sensors is implemented by an internal integrated circuited port; however, this should not be a limitation of the present application. For instance, functionality associated with an MCU may be embedded within the component(s) (e.g., the semiconductor chip(s)) used to provide a CPU in some embodiments.

The electronic apparatus 1100/1200 is characterized in that: the micro-processor 1130 can be selectively enabled or disabled to save power. For example, the plurality of sensors 1121-1212N may include an accelerometer, and the sensing signal generated by the accelerometer can be used for controlling enabling and disabling of the micro-processor 1130. In more details, when the accelerometer generates an acceleration-related sensing signal, it represents that the electronic apparatus 1100/1200 is moving (for example, the sensing signal can be at a high level at this time) so as to enable the micro-processor 1130. After the micro-processor 1130 is enabled, it can merge the sensing signals S1-SN generated by the plurality of sensors 1121-112$n$ to generate a sensing-merged signal SF according to an algorithm. The sensing-merged signal SF is then transmitted from the micro-processor 1130 to the application processor 1110/1210 in order to let the application processor 1110/1210 execute the corresponding application procedure.

Figure 6:
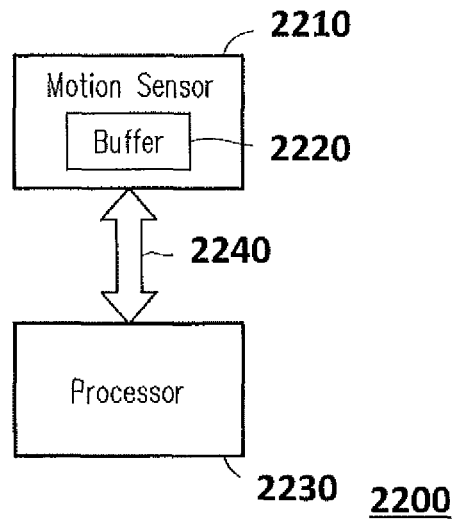
FIG. 6 is a schematic diagram showing an electronic device according to another embodiment of the present application.

The advantage of the configuration of the present application is that: determining whether to enable the micro-processor 1130 to save power by using characteristics of the plurality of sensors. For example, in the abovementioned embodiment, it can determine whether to enable the micro-processor 1130 by adopting the accelerometer sensor. In other words, the electronic apparatus 1100/1200 with such configuration can determine whether to enable the micro-processor 1130 to execute the corresponding application procedure to save power based on the motion detection itself. Please be noted that, in one embodiment of the electronic apparatus 1100/1200 of the present application, the micro-processor 1130 and at least one of the plurality of sensors 1121-112$n$ are not packed in a single chip, however, this should not be a limitation of the present application. Some of the plurality of sensors 1121-112$n$ can be packed in a single chip. Furthermore, the micro-processor 1130 is independent with the application processor 1110/1210, and they are not packed in a single chip. Please note that, driver programs of the plurality of sensors 1121-112$n$ can be preloaded into the micro-processor 1130. Therefore, if a developer adopts the micro-processor 1130 of the present application, the sensing signals S1-SN of the plurality of sensors 1121-112$n$ can be successfully processed. The advantage of the configuration of the present application is that: the elasticity for choosing sensor chip vendors can be improved. FIG. 6 is a schematic diagram showing an electronic device 2200 according to an embodiment of the present application. The electronic device 2200 may be a smart phone, a personal digital assistant (PDA), a tablet computer, a remote control, or any other electronic device that can be moved and/or rotated. The electronic device 2200 includes a motion sensor 2210, a processor 2230, and a bus 2240. The motion sensor 2210 includes a buffer 2220. The processor 2230 is coupled to the motion sensor 2210 through the bus 2240.

Please note that the motion sensor may be a gyro-sensor, an accelerometer, a 6-axis motion sensor or a 9-axis motion sensor. In an embodiment of the present application, the motion sensor 2210 may be a gyro-sensor that detects and samples the angular velocity of the electronic device 2200. In another embodiment of the present application, the motion sensor 2210 may be an accelerometer that detects and samples the acceleration of the electronic device 2200. In another embodiment of the present application, the motion sensor 2210 may be a 6-axis motion sensor that detects and samples the acceleration or the angular velocity of the electronic device 2200. In another embodiment of the present application, the motion sensor 2210 may be a 9-axis motion sensor that detects and samples the acceleration, the angular velocity or the magnetism of the electronic device 2200. Those skilled in the art can readily understand 6-axis motion sensor comprises a 3-axis gyroscope and a 3-axis accelerometer, and further description is omitted here for brevity. Similarly, the 9-axis motion sensor comprises a 3-axis gyroscope, a 3-axis accelerometer and a 3-axis compass, and further description is omitted here for brevity. The buffer 2220 may be a first-in-first-out (FIFO) register that can store a plurality of samples produced by the motion sensor 2210. The processor 2230 may be the CPU, a microprocessor, or an embedded controller of the electronic device 2200.

Figure 7:
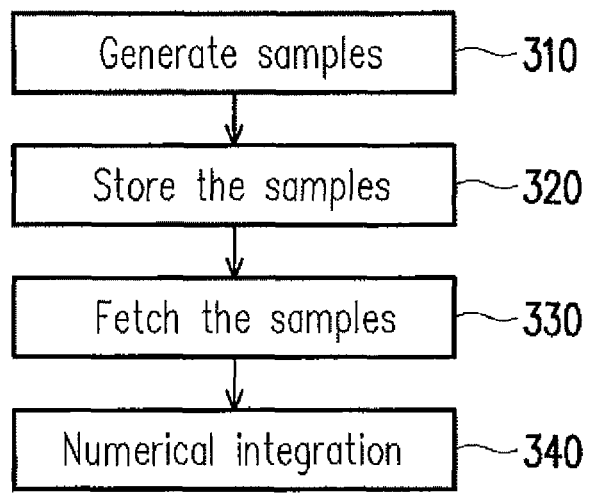
FIG. 7 is a flow chart showing a method of motion processing according to another embodiment of the present application.

FIG. 7 is a flow chart showing a method of motion processing according to an embodiment of the present application. The method shown in FIG. 7 may be executed by the electronic device 2200. In step 310, the motion sensor 2210 performs a sampling at a predetermined sampling rate. The processor 2230 may set the sampling rate for the motion sensor 2210 by accessing a configuration register of the motion sensor 2210 before executing the method shown in FIG. 7. In each sampling, the motion sensor 2210 generates a sample by sampling an angular velocity or an acceleration of the electronic device 2200. In step 320, the motion sensor 2210 stores each sample generated in step 310 in the buffer 2220.

In step 330, the processor 2230 polls the motion sensor 2210 periodically at a predetermined polling rate. The sampling rate for the motion sensor 2210 may be higher than or equal to the polling rate for the processor 2230. Therefore, each time when the processor 2230 polls the motion sensor 2210, there may be already a plurality of samples stored in the buffer 2220 so that the processor 2230 may fetch more than one sample from the buffer 2220. The processor 2230 may fetch a part or all of the samples stored in the buffer 2220 in each aforementioned polling. The processor 2230 performs the polling and the fetching through the bus 2240.

In step 340, the processor 2230 performs a numerical integration based on the samples fetched in step 330. When the motion sensor 2210 is a gyro-sensor, the samples may be angular velocities of the electronic device 2200 and the result of the numerical integration may be an angle of the rotation or the orientation of the electronic device 2200. When the motion sensor 2210 is an accelerometer, the samples may be accelerations of the electronic device 2200 and the result of the numerical integration may be a velocity or a distance of the translation of the electronic device 2200. The processor 2230 may use a part or all of the samples fetched in step 330 to perform the numerical integration. The more samples used, the smaller the accumulated error of the numerical integration.

Figure 8:
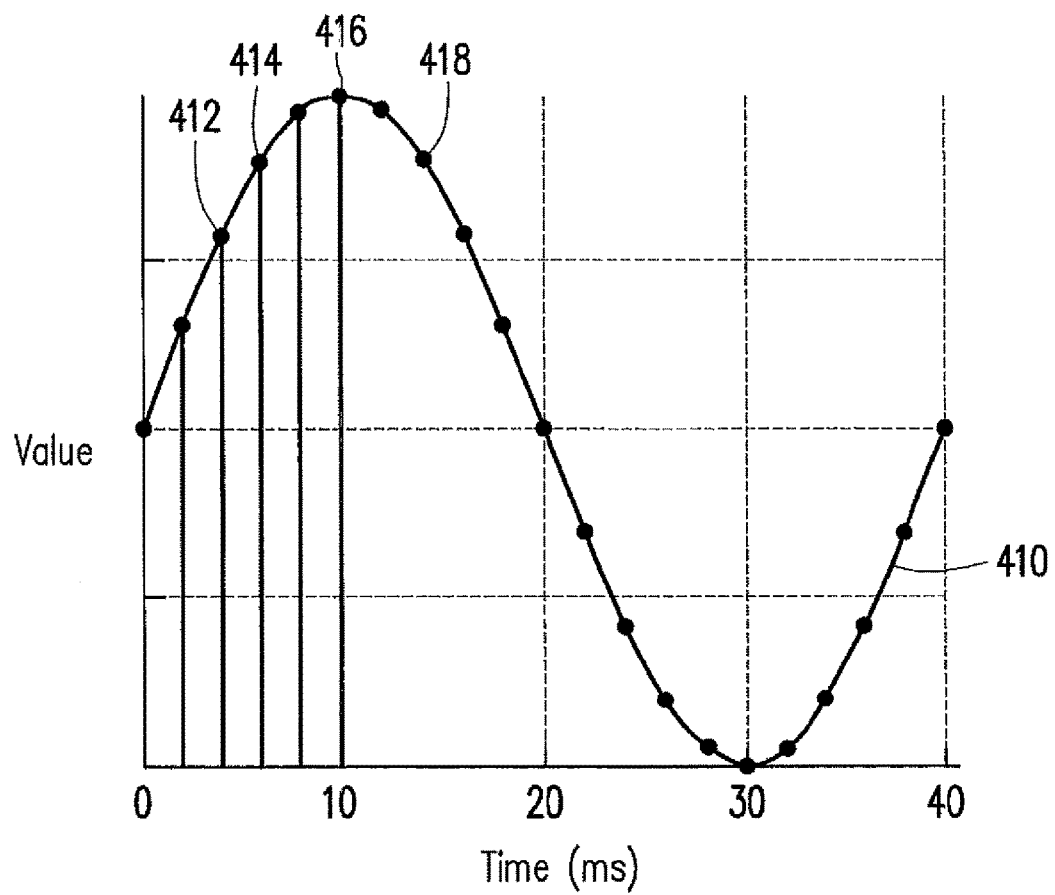
FIG. 8 is a schematic diagram showing the sampling of a motion processing according to another embodiment of the present application.

FIG. 8 is a schematic diagram showing the sampling of a motion processing of the electronic device 2200 according to an embodiment of the present application. The curve 410 represents the angular velocity or the acceleration sampled by the motion sensor 2210. The samples are represented by round dots on the curve 410, such as the samples 412, 414, 416 and 418.

In this embodiment, the sampling rate of the motion sensor 2210 is 500 Hz and the polling rate of the processor 2230 is 100 Hz. In other words, the motion sensor 2210 produces a sample every two milliseconds, while the processor 2230 polls the motion sensor 2210 every ten milliseconds. At each polling, there are already five samples stored in the buffer 2220 waiting for the processor 2230. The processor 2230 may fetch a part or all of the five samples stored in the buffer 2220.

In this way, the processor 2230 may set the sampling rate of the motion sensor 2210 to be much higher than the polling rate of the processor 2230 such that there are a lot of samples available to the processor 2230 at each polling. The low polling rate can free the processor 2230 from frequently accessing the bus 2240 for the polling and the fetching so that the processor 2230 has more time to process the other tasks of the electronic device 2200. In addition, the high sampling rate of the motion sensor 2210 means more samples and smaller accumulated error of the numerical integration.

In this embodiment, the processor 2230 uses the sampling period corresponding to the sampling rate of the motion sensor 2210 as the height (or width) of the trapezoids defined by the samples to perform the numerical integration in step 340. In other words, the processor 2230 performs the numerical integration according to the clock of the motion sensor 2210 instead of the clock of the processor 2230 itself, which eliminates the accumulated error caused by two asynchronous clocks. The motion sensor 2210 is dedicated to generating the samples according to its own clock. Unlike the processor 2230, the motion sensor 2210 has no other distracting tasks. Therefore, the sampling time of the motion sensor 2210 is very accurate, which helps to reduce the accumulated error of the numerical integration.

In summary, the present application can effectively reduce the accumulated error of the numerical integration in motion processing by more accurate sampling time and higher sampling rate. Moreover, the present application does not require a dedicated pin of the processor because the processor does not need interrupt for fetching the samples.

It should be noted that, in some embodiments, fetch behavior of the processing signal from sensor hub (MCU) to the application processor (AP or CPU) may be altered depending on the application. By way of example, for gaming applications (which may require a relatively fast update frequency), the system may defer to using a bypass mode, in which batch fetching may not be performed. A potential disadvantage in using such a bypass mode may involve the AP needing to wake up frequently (e.g., waking up every time it retrieves signals from the MCU). In contrast, for PDR or health monitoring functions (which may not require updating as fast), the AP would fetch processing signals in batch mode to reduce power consumption.

Meanwhile, in some embodiments, a gyroscope may need to fetch samples in batch mode such as under a precise clock of the gyroscope or an outside timer. This is because the samples generated by the gyroscope are in the form of relative vectors. Such relative vectors typically are computed under integral calculation to obtain a relative rotation angle. As a result, the sampled data is typically reserved in a sequence format (similar to streaming, which may be referred to as a streaming mode) in the buffer in order to increase accuracy. Thus, accuracy is a primary reason for using the batch mode in the sensor side, though power consumption may also be a consideration.

Unlike that of the gyroscope, samples generated by the accelerometer are absolute directional vectors. With respect to system usage, the system may not need to retrieve accelerometer samples as frequently as gyroscope samples. For instance, the MCU may retrieve accelerometer samples in 20-40 ms without much deviation, while the MCU may retrieve gyroscope samples in 5 ms. Therefore, the accelerator samples may only need to be uploaded to the MCU when the MCU determines that a sample is required.

Figure 9:
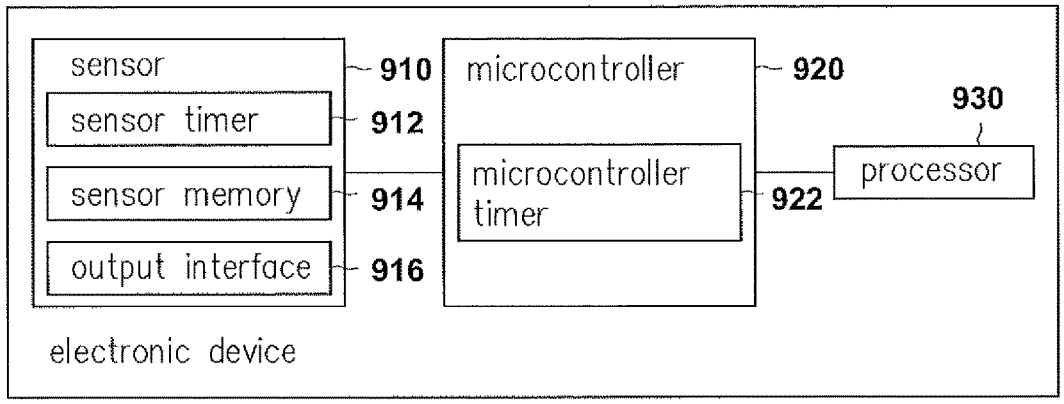
FIG. 9 illustrates an electronic device according to another embodiment of the present application.

FIG. 9 illustrates an electronic device in accordance with one of the exemplary embodiments of the disclosure. The functionalities of the components are disclosed in more detail in conjunction with FIG. 10.

Referring to FIG. 9, for exemplary purposes, an electronic device 900 includes a sensor 910, a microcontroller 920 (e.g., MCU), and a processor 930 (e.g., CPU or AP). It should be noted that, in other embodiments, the mobile electronic device 900 could include more than one sensor. The disclosure is not limited in this regard.

The sensor 910 could be any types of sensor that detects events or changes in its environment and provides a corresponding output such as a motion sensor, a voltage sensor, a light sensor, an image sensor, a microphone, and so forth. The sensor 910 would include a sensor timer 912 to provide timing signals for the sensor 910 itself for detecting events and sample data in a predefined frequency. The sensor 910 would further include a sensor memory 914 and an output interface 916 to respectively store and output the detected data along with timestamps. The sensor memory 914 could be a first-in-first-out (FIFO) buffer. For exemplary purposes, in the present embodiment, the motion sensor 910 may be one or a combination of an accelerometer (e.g. G-sensor), a gyroscope (e.g. gyro-sensor), or any sensor that detects the liner movement, the direction of the linear movement, or the rotational movement of the mobile electronic device 900. For example, a three-axis accelerometer would output acceleration data corresponding to each axis in response to any detection of a sudden movement when the electronic device 900 encounters an external force. A gyroscope would detect a rotational movement of the mobile electronic device 900 rotating about a particular axis in space and output data representing the rotational movement. A combination of the accelerometer and the gyroscope may create a more accurate measurement of an overall movement and orientation of the electronic device 900.

The microcontroller 920 may be a sensor hub electrically coupled to the sensor 910 through, for example, a serial peripheral interface bus (SPI) or inter integrated circuits (I2C). The microcontroller 920 is configured to integrate and process data obtained from the sensor and transmit the processed result to the processor 930 thereafter. It should be noted that, in the present embodiment, the microcontroller 920 would further include a timer 922 to keep accurate time with high accuracy and low-power consumption. Such timer is also known as a high accuracy timer, and may be referred to as "microcontroller timer 922" hereinafter.

The processor 930 may include one or more of a North Bridge, a South Bridge, a field programmable array (FPGA), a programmable logic device (PLD), an application specific integrated circuit (ASIC), or other similar device or a combination thereof. The processor 930 may also include a central processing unit (CPU), a programmable general purpose or special purpose microprocessor, a digital signal processor (DSP), a graphics processing unit (GPU), an application specific integrated circuit (ASIC), a programmable logic device (PLD), an application processor (AP) or other similar device or a combination thereof. The processor 930 would be electrically coupled to the microcontroller 920 through, for example, I2C and SPI.

Figure 10:
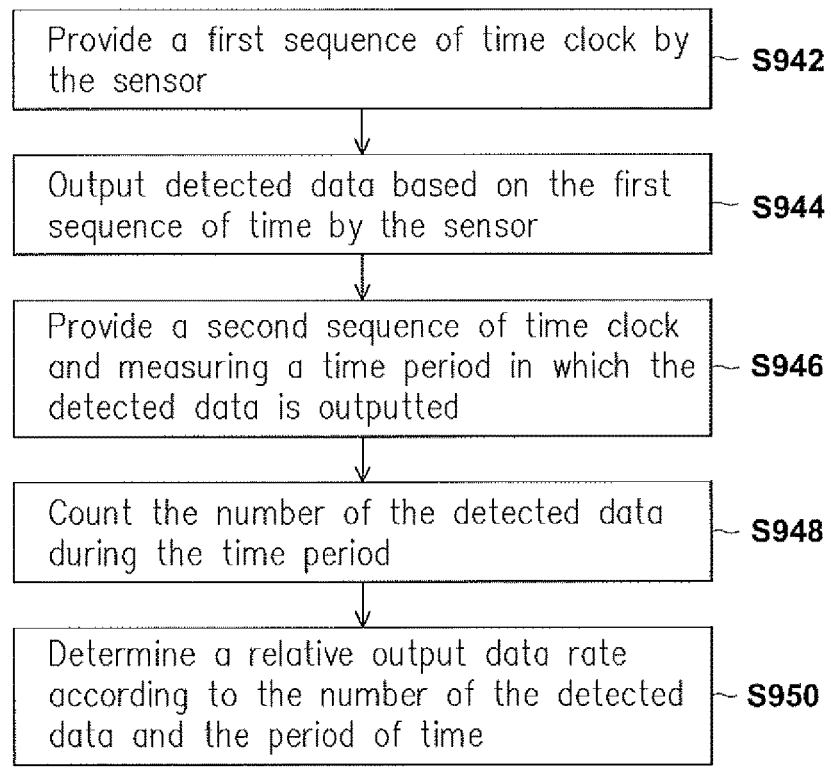
FIG. 10 illustrates a flowchart of a sensor time calibration method according to another embodiment of the present application.

FIG. 10 illustrates a flowchart of a sensor time calibration method in accordance with one of the exemplary embodiments of the disclosure. The steps of FIG. 10 could be implemented by the proposed electronic device 900 as illustrated in FIG. 9.

Referring to both FIG. 9 and FIG. 10, first, the sensor timer 912 of the sensor 910 would provide a first sequence of time clock (Step S942), and the output interface 916 of the sensor 910 would output detected data based on the first sequence of time clock (Step S944). Meanwhile, the microcontroller timer 922 would provide a second sequence of time clock and measure a time period in which the output interface 916 of the sensor 910 outputs the detected data (Step S946). In other words, the detected data would be generated according to the first sequence of time clock of the sensor timer 912 as the sensor 910 would normally operate. For example, if the frequency of the first sequence of time clock is predefined as 100 Hz, the output interface 916 would output detected data every 10 ms. While the sensor 910 is operating, the microcontroller timer 922 would also provide its own sequence of time clock over a time period for time measurement purposes.

To be specific, from the sensor's (910) perspective, the sensor timer 912 would be considered as an embedded timer which provides a sequence of time clock (i.e. the aforementioned first sequence of time clock). The microcontroller timer 922 would be considered as an external timer which provides another sequence of time clock (i.e. the aforementioned a second sequence of time clock). Assume that the microcontroller timer 922 is considered as an absolute time reference. Ideally, the sensor timer 912 should be synchronized to the microcontroller timer 922. However, some instances such as fluctuating ambient temperatures and manufacturing limitation may adversely affect the accuracy of the sensor timer 912 and cause time deviation with respect to the microcontroller timer 922. Such time deviation may be positive or negative that would result in a sensing result with a significantly amount of error. That is, a predefined output data rate of the sensor 910 is unreliable. Therefore, in the present embodiment, timestamps associated with the detected data outputted by the sensor 910 would be calibrated based on the second sequence of time clock.

In detail, the microcontroller 920 would count the number of the detected data during the time period (Step S948) and determine a relative output data rate according to the number of the detected data and the period of time (Step S950). That is, the microcontroller 920 would count the number of the detected data output by the sensor 910 over the time period measured by the microcontroller timer 922 upon the accumulation basis.

The microcontroller 920 could count the number of the detected data by various approaches. In an embodiment, each piece of the detected data of the sensor 910 is associated with an interrupting signal, and thus the microcontroller 920 could count the number of interrupting signals received from the sensor 910 during the time period. In another embodiment, each piece of the detected data is temporarily stored in the sensor memory 914 of the sensor 910, and thus the microcontroller 920 could access the sensor memory 914 and determine the number of the detected data stored therein during the time period. Once the number of the detected data is determined, the microcontroller 920 could calculate the relative output data rate by taking an average of the number of the detected data accumulated over the period of time. The relative output data rate could be evaluated on a larger time scale for a relatively optimal result.

In an embodiment, consider that the temperature variation could reduce the precision of the sensor 910 significantly when the sensor 910 is used in a changing environment (especially when the electronic device 900 is portable which can be used anytime and anywhere) or when the processor 930 is multithreaded. In such instances, time compensation would be needed for the bias. Thus, in the present embodiment, the electronic device 900 could further include a temperature sensor (not shown), and the microcontroller 920 could periodically determine whether temperature drift occurs in the electronic device 900 according to the detected data obtained from the temperature sensor. If yes, the microcontroller 920 would adjust the measured time period of its microcontroller timer 922. For example, the microcontroller 920 could extend the measured time period to a larger time scale to minimize the influence caused by the sudden drift.

In an embodiment, after the microcontroller 920 determines the relative output data rate, it would further determine whether the difference between the relative output data rate and the predefined output data rate of the sensor 910 is greater than a tolerance threshold. If the difference is greater than the tolerance threshold, the microcontroller 920 would calibrate the timestamps associated with the detected data according to the relative output data rate of the sensor 910. Otherwise, the microcontroller 920 would not make any adjustment. It should be noted that, the calibration is only performed on the timestamps associated with the detected data but not on the sensor's hardware. In other words, the actual output data rate of the sensor 910 remains the same as its manufacturing default setting. Moreover, the microcontroller 920 could store the calibrated timestamps along with the detected data in a database or further transmit those to the processor 930 for other purposes.

Figure 11:
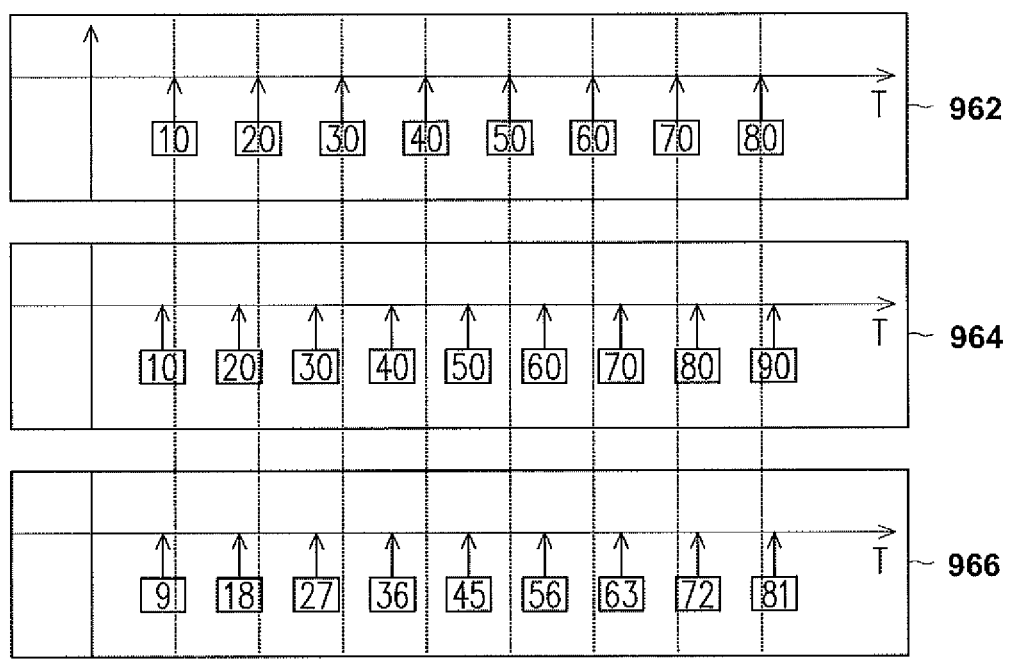
FIG. 11 illustrates a schematic diagram of an application scenario of a sensor time calibration method according to another embodiment of the present application.

FIG. 11 illustrates a schematic diagram of an application scenario of a sensor time calibration method in accordance with one of the exemplary embodiments of the disclosure.

Referring to FIG. 11, suppose that the predefined output data rate of the sensor 910 is 100 Hz. Ideally, the sensor 910 should have outputted detected data at 10 ms, 20 ms, . . . , 70 ms, and 80 ms with respect to real time as presented in a result 962. However, when there exists a 1 ms offset (i.e., 10% error rate) between the predefined output data rate and the actual output data rate, a result 964 would be presented. That is, the detected data is outputted at 9 ms, 18 ms, 27 ms, . . . , 81 ms with respect to the real time (i.e., microcontroller time) and yet timestamped at 10 ms, 20 ms, . . . , 70 ms, 80 ms, and 90 ms. The microcontroller 920 would calculate the relative output data rate by dividing the reference time period (i.e., 81 ms) by the number of the detected data during such time period (i.e., 9). In this case, the relative output data rate would be 9 ms, and the calibrated timestamps would be 9 ms, 18 ms, 27 ms, . . . , 81 ms as presented in a result 9666.

Figure 12:
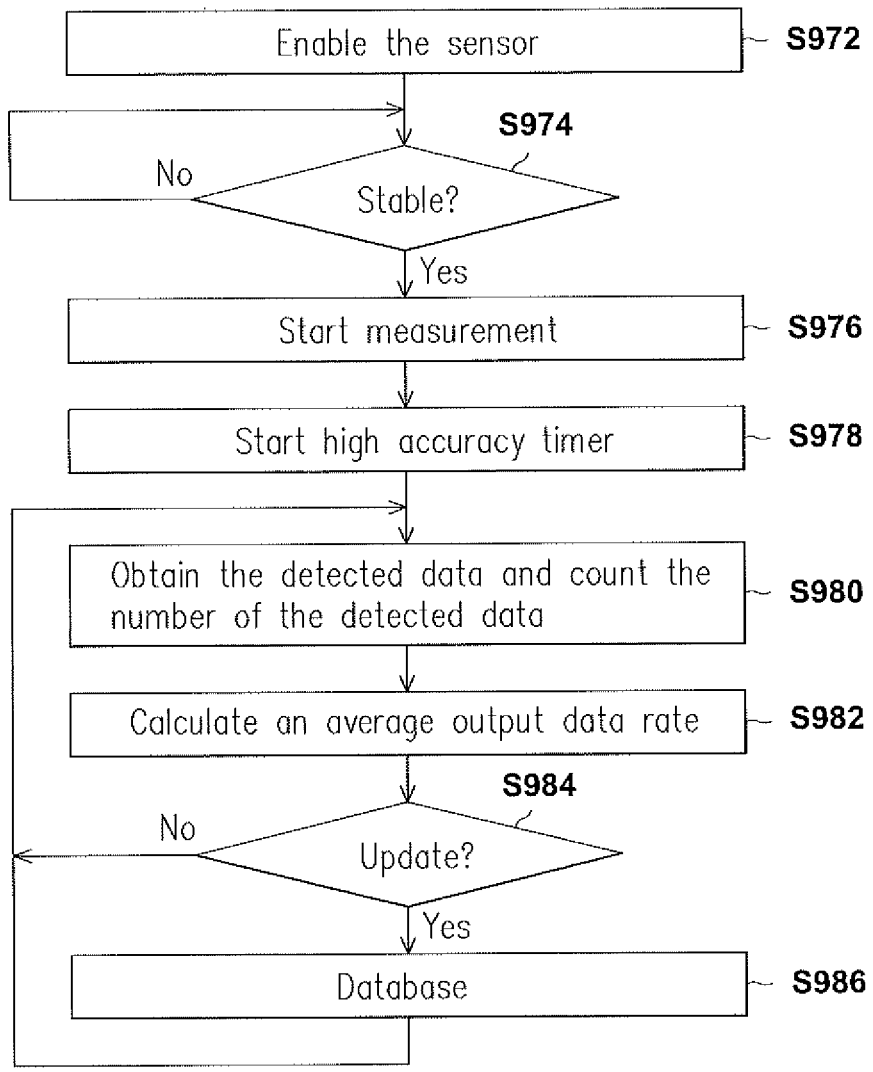
FIG. 12 illustrates a flowchart of an application scenario of a sensor time calibration method according to another embodiment of the present application.

FIG. 12 illustrates a flowchart of an application scenario of a sensor time calibration method in accordance with one of the exemplary embodiments of the disclosure. In the present embodiment, the sensor 910 would be a Gyro sensor.

Referring to FIG. 12, first, the sensor 910 would be enabled (Step S972), either by default or manually by the user of the electronic device 900. Next, to avoid the uncertainty in circuit delay, a waiting time would be given until the sensor 910 becomes stable before it performs actual measurement (Step S974). Once the sensor 910 is stable, the sensor 910 would start the measurement (Step S976). Concurrently, the microcontroller 920 would start its high accuracy timer (Step S978). Next, the microcontroller 920 would obtain detected data from the sensor 910 and count the number of the detected data (Step S980) so as to calculate an average output data rate (i.e., the aforementioned relative output data rate) (Step S982). The microcontroller 920 would determine whether to update the average output data rate to a database by comparing the difference between the predefined output data rate of the sensor 910 and the average output data rate (Step 984). If yes, the microcontroller 920 would update the average output data rate along with the detected data to a database (Step S986) and return to Step S980 and start another average output data rate calculation. If no, the microcontroller 920 would directly return to Step S980. The details of Steps S972-S986 may refer to the related description of FIG. 10 and would not be repeated hereinafter.

Figure 13:
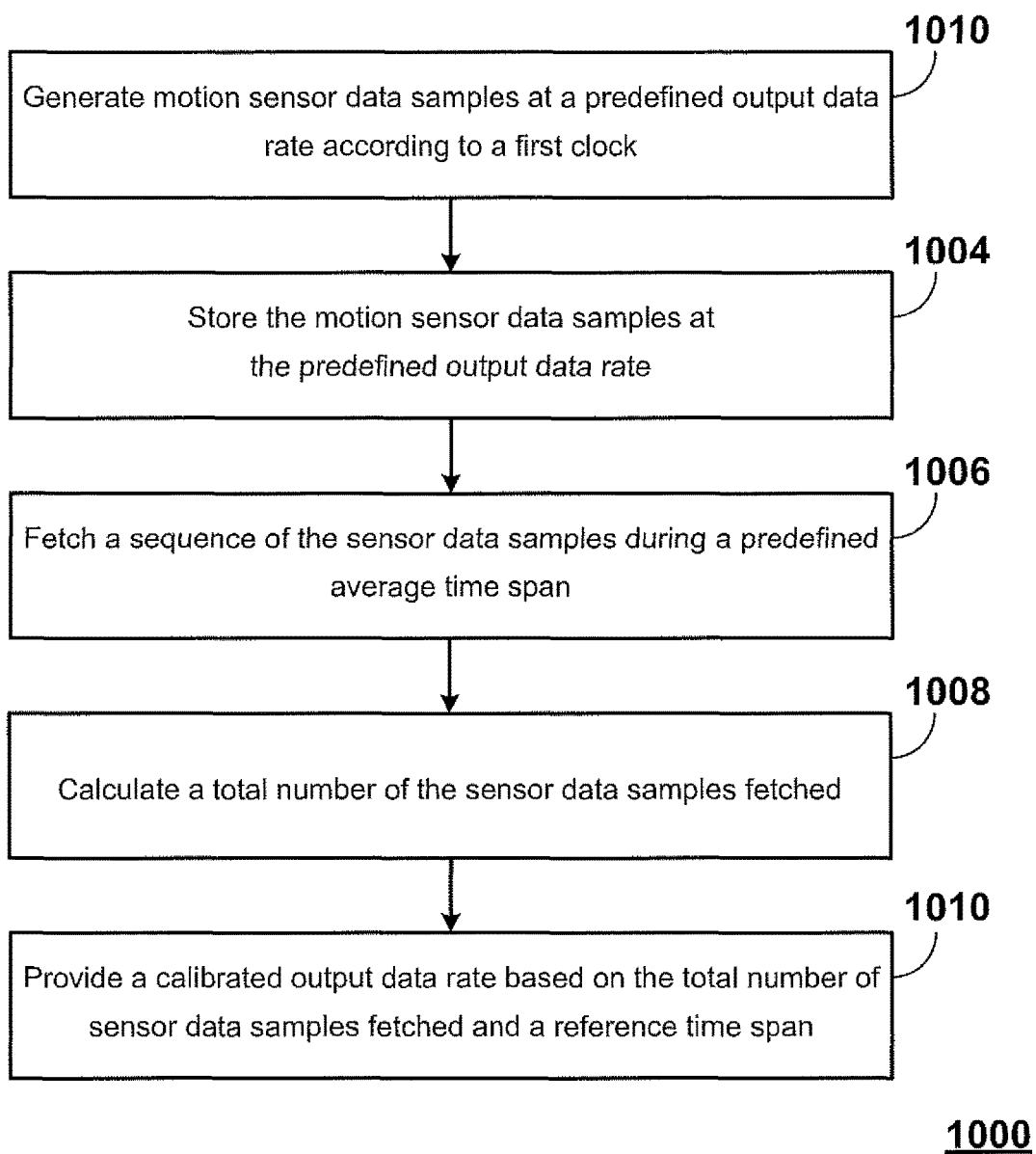
FIG. 13 illustrates a flowchart of a sensor time calibration method according to another embodiment of the present application.

FIG. 13 illustrates a flowchart of a sensor time calibration method according to another embodiment of the present application. It should be noted that the method may be implemented on various devices, such as device 900 of FIG. 9, for example.

As shown in FIG. 13, the method 1000 may be construed as beginning at block 1002, in which motion sensor data samples of a motion sensor (e.g., sensor 910) are generated at a predefined output data rate according a first clock (e.g., timer 912). BY way of example, the motion sensor may be a gyroscope. In block 1004, the motion sensor data samples are stored at the predefined output data rate. Then, as depicted in block 1006, a sequence of the sensor data samples is fetched during a predefined average time span. In block 1008, a total number of the sensor data samples fetched is calculated and, then, a calibrated output data rate is provided based on the total number of sensor data samples fetched and a reference time span (block 1010). In particular, the reference time span is provided by a second clock and corresponds to a time span during which the sensor data samples were stored at the predefined output data rate.

With respect to the functionality of block 1004, in some embodiments, a motion sensor (e.g., sensor 910) that may perform the storing of the sensor data samples may store the sensor data samples in a buffer (e.g., memory 914). Additionally, the motion sensor may generate a sample count indicating the number of samples stored in the buffer, and provide a flush signal in response to the sample count corresponding to a watermark value (e.g., a predetermined value). In response to receiving the flush signal, a microcontroller (e.g., microcontroller 920) may be used to fetch the sensor data samples (such as in batches) from the buffer (block 1006).

In some embodiments, a microcontroller may be configured to selectively operate in a power saving mode and a sample fetch mode. In particular, when in the power saving mode, the microcontroller is able to receive a flush signal from the motion sensor and switch to the sample fetch mode. Once in the sample fetch mode, the microcontroller fetches the sensor data samples from the first buffer.

In some embodiments, a microcontroller incorporates a buffer that is used for storing the sensor data samples fetched from the buffer of the motion sensor. Additionally or alternatively, the microcontroller is configured to associate a corresponding time indicator with selected ones of the sensor data samples fetched from the buffer of the motion sensor. Generating of the time indicators may be accomplished in response to an inquiry command provided by the microcontroller responsive to receiving a flush signal from the motion sensor. Notably, the time indicators are generated according the second clock (e.g., timer 922) in order to provide reference timing (e.g., timestamps, time flags) for determining the reference time span. In particular, the microcontroller determines the reference time span, which corresponds to the time span during which the sensor data samples were stored at the predefined output data rate (but with respect to the more accurate clock of the microcontroller), based on a difference between consecutive ones of the time indicators.

With respect to block 1010, in some embodiments, the calibrated output data rate is calculated by dividing the total number of sensor data samples fetched by the reference time span. Using the calibrated output rate (and the sensor data samples), a microcontroller may calculate a rotation angle associated with the mobile device. Of note, each of the sensor data samples fetched represents a rotation speed associated with the mobile device. In those embodiments that incorporate an accelerometer for generating acceleration signals, the microcontroller may be configured to perform a preset processing according to the acceleration signals and the rotation angle to obtain a motion result.

With respect to the use of the predefined average time span, in some embodiments, the predefined average time span is established to extend over at least two consecutive batches of the sensor data samples. It should be noted that the predefined average time span may be adjusted based on one or more of various factors. By way of example, if a difference in time spans associated with the two consecutive batches is lower than a time difference threshold, the microcontroller may increase the predefined average time span to ensure accuracy. As another example, if a detected temperature variance increases, the microcontroller may decrease the predefined average time span for similar reasons.

Figure 14:
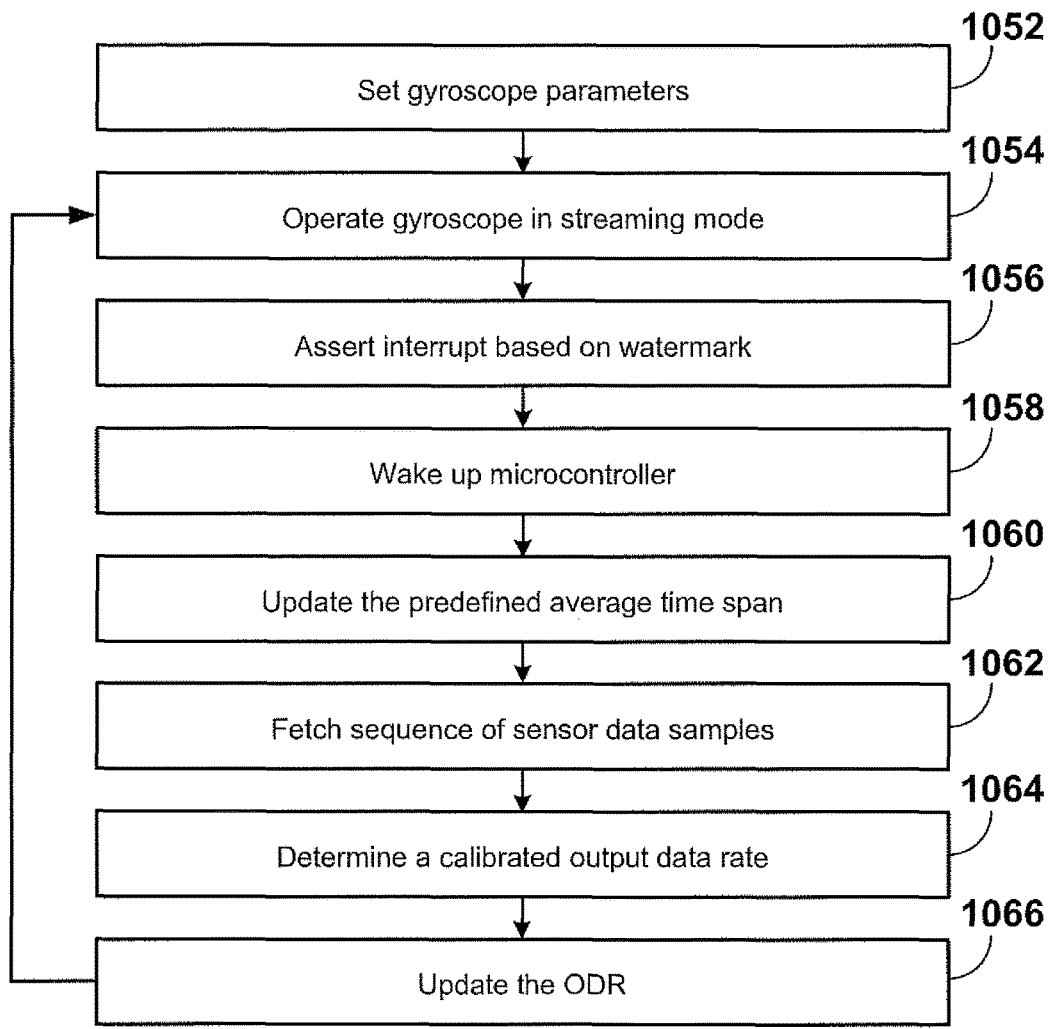
FIG. 14 illustrates a flowchart of a sensor time calibration method according to another embodiment of the present application.

FIG. 14 illustrates a flowchart of a sensor time calibration method according to another embodiment of the present application. As shown in FIG. 14, the method 1050 may be construed as beginning at block 1052, in which parameters associated with a gyroscope are set. For instance, the parameters may include one or more of: setting a predefined output data rate (i.e., the sampling rate based on a clock generated by a sensor timer); setting a watermark or threshold value corresponding to a number of samples to be output in a batch; setting a buffer of the gyroscope; and, setting the initial predefined average time span over which the microcontroller obtains sensor data samples from the buffer of the gyroscope. In some embodiments, the initial predefined average time span is set to a number of sensor data samples corresponding to between approximately 5 and approximately 10 batches.

In block 1054, the gyroscope is operated in a streaming mode, which may include filtering out initial sensor data samples generated prior to the gyroscope stabilizing. In some embodiments, the microcontroller is operated in a sleep mode prior to an interrupt being asserted.

In block 1056, an interrupt is asserted based on a watermark. In particular, if a number of sensor data samples in the buffer corresponds to the watermark (i.e., a threshold value), an interrupt signal (e.g., a flush signal) is provided to the microcontroller. As depicted in block 1058, the interrupt signal causes the microcontroller to wake up. Upon waking up, the microcontroller may perform one or more of various functions, such as: fetching sensor data samples in batches from the gyroscope buffer; determine the number of samples fetched; and, perform a time synchronizing operation. As described before, a time synchronizing operation may involve a form of time coding of the samples in response to the interrupt signal.

Continuing to block 1060, the predefined average time span may be updated. For instance, if a detected temperature drift or variance increases, the predefined average time span may be decreased; and/or, if a difference in time spans associated with consecutive batches of sensor data samples is lower than a time difference threshold, the predefined average time span may be increased.

In block 1062, a sequence of the sensor data samples fetched from the gyroscope buffer are collected by the microcontroller. In particular, the sequence corresponds to sensor data samples stored during the predefined average time span of the microcontroller. In some embodiments, the microcontroller calculates the time span from the first sample to the last sample of the sequence by analyzing the times associated with the sample (such as by reviewing time flags generated in response to the interrupt signals). The number of sensor data sample may also determined based on the counter of the buffer.

Then, in block 1064, a calibrated output data rate is determined by the microcontroller. In some embodiments, this is facilitated by dividing the time span by the number of samples in the corresponding sequence to determine a time variance (i.e., $\Delta t$) between each sample with respect to the output data rate. The microcontroller is then able to update the output data rate by the time variance (block 1066). This enables angular speed determinations to be updated by the time variance in order to obtain accurate calculations of change in rotation angle. After block 166, the process may return to block 1054, for example.

In view of the aforementioned descriptions, since the predefined output data rate of the sensor timer could be unstable due to manufacturing limitation or temperature variation, timestamps associated with the detected data generated by the sensor could be dynamically calibrated based on the high accuracy timer.

It will be apparent to those skilled in the art that various modifications and variations can be made to the structure of the present application without departing from the scope or spirit of the invention. In view of the foregoing, it is intended that the present application cover modifications and variations of this invention provided they fall within the scope of the following claims and their equivalents.

The invention claimed is:
1. A mobile device, comprising:
   a motion sensor having sensor circuitry and a first clock, the motion sensor being configured to generate and store sensor data samples at a predefined output data rate according the first clock; and
   a microcontroller, having circuitry, coupled to the motion sensor and being configured to fetch, during a predefined average time span, a sequence of the sensor data samples from the motion sensor and calculate a total number of the sensor data samples fetched;
wherein the microcontroller is further configured to provide a calibrated output data rate based on the total number of sensor data samples fetched and a reference time span, corresponding to a time span during which the sensor data samples were stored at the predefined output data rate, provided by a second clock;
wherein the microcontroller is further configured to determine whether a difference between the predefined output data rate and the calibrated output data rate corresponds to a tolerance threshold such that, in response to the difference corresponding to the tolerance threshold, the microcontroller adjusts time indicators associated with the sensor data samples without adjusting the predefined output data rate of the motion sensor.

2. The mobile device of claim 1, wherein:
the motion sensor has a first buffer;
the motion sensor is configured to store the sensor data samples in the first buffer, generate a sample count indicating the number of samples stored in the first buffer, and provide a flush signal in response to the sample count corresponding to a watermark value; and
the microcontroller is configured to fetch the sensor data samples in batches from the first buffer response to receiving the flush signal.

3. The mobile device of claim 2, wherein:
the microcontroller is configured to selectively operate in a power saving mode and a sample fetch mode;
in the power saving mode, the microcontroller is operative to receive the flush signal and switch to the sample fetch mode; and
in the sample fetch mode, the microcontroller fetches the sensor data samples in batches from the first buffer.

4. The mobile device of claim 2, wherein:
the microcontroller has a second buffer; and
the microcontroller is configured to store, in the second buffer, the sensor data samples fetched from the first buffer.

5. The mobile device of claim 2, wherein:
the microcontroller is configured to associate, with selected ones of the sensor data samples fetched from the first buffer, corresponding ones of the time indicator; and
the time indicators are generated according the second clock.

6. The mobile device of claim 5, wherein:
the microcontroller is configured to assert an inquiry command in response to receiving the flush signal; and
each of the time indicators is generated in response to a corresponding one of the inquiry commands.

7. The mobile device of claim 5, wherein the microcontroller is configured to determine the reference time span based on a difference between consecutive ones of the time indicators.

8. The mobile device of claim 5, wherein:
the time indicators are time flags; and
the mobile device further comprises a reference timer configured to generate the time flags according the second clock.

9. The mobile device of claim 2, wherein:
the microcontroller is further configured to calculate a rotation angle associated with the mobile device based on the sensor data samples fetched in batches and the calibrated output data rate; and each of the sensor data samples fetched represents a rotation speed associated with the mobile device.

10. The mobile device of claim 9, wherein:
the mobile device further comprises an accelerometer configured to generate acceleration signals; and
the microcontroller is further configured to perform a preset processing according to the acceleration signals and the rotation angle to obtain a motion result.

11. The mobile device of claim 2, wherein the predefined average time span is at least over two consecutive batches of the sensor data samples.

12. The mobile device of claim 11, wherein the microcontroller is further configured to:
increase the predefined average time span if a difference in time spans associated with the two consecutive batches is lower than a time difference threshold; and
decrease the predefined average time span if a detected temperature variance increases.

13. The mobile device of claim 1, wherein the calibrated output data rate is calculated by dividing the total number of sensor data samples fetched by the reference time span.

14. The mobile device of claim 1, wherein the motion sensor is a gyroscope.

15. A sensor time calibration method comprising:
generating motion sensor data samples at a predefined output data rate according a first clock;
storing, in a first buffer, the motion sensor data samples at the predefined output data rate;
generating a sample count indicating the number of samples stored in the first buffer;
providing a flush signal in response to the sample count corresponding to a watermark value;
fetching, by a microcontroller configured to selectively operate in a power saving mode and a sample fetch mode, a sequence of the sensor data samples during a predefined average time span, wherein the sensor data samples are fetched in batches from the first buffer in response to receiving the flush signal;
calculating a total number of the sensor data samples fetched; and
providing a calibrated output data rate based on the total number of sensor data samples fetched and a reference time span, corresponding to a time span during which the sensor data samples were stored at the predefined output data rate, provided by a second clock;
wherein the microcontroller is operated in the power saving mode, then, in response to receiving the flush signal, operated in the sample fetch mode such that the microcontroller fetches the sensor data samples in batches from the first buffer.

16. The method of claim 15, further comprising storing the sensor data samples fetched from the first buffer in a second buffer.

17. The method of claim 15, further comprising associating a corresponding time indicator with selected ones of the sensor data samples fetched from the first buffer, wherein the time indicators are generated according the second clock.

18. The method of claim 15, further comprising:
increasing the predefined average time span if a difference in time spans associated with the two consecutive batches is lower than a time difference threshold; and
decreasing the predefined average time span if a detected temperature variance increases.

* * * * *